Sept. 17, 1929.  H. C. ROTH  1,728,510
METHOD FOR THE MANUFACTURE OF CHROMIC OXIDE
Filed May 12, 1927
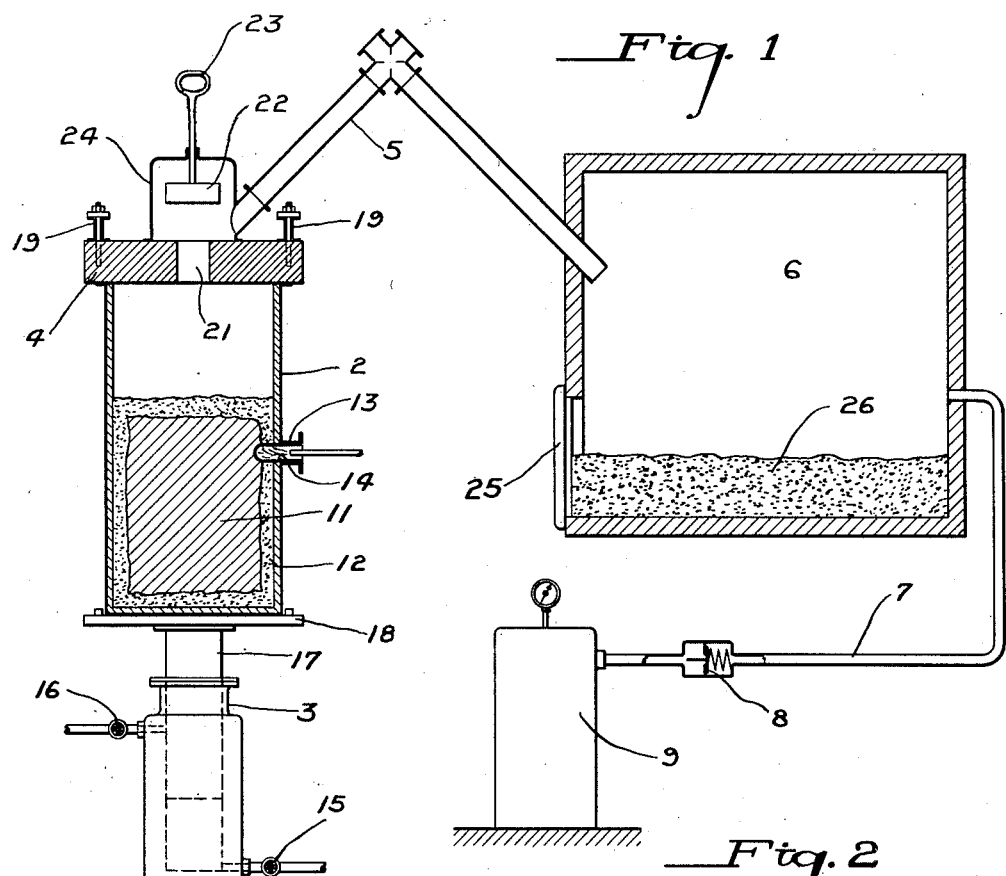
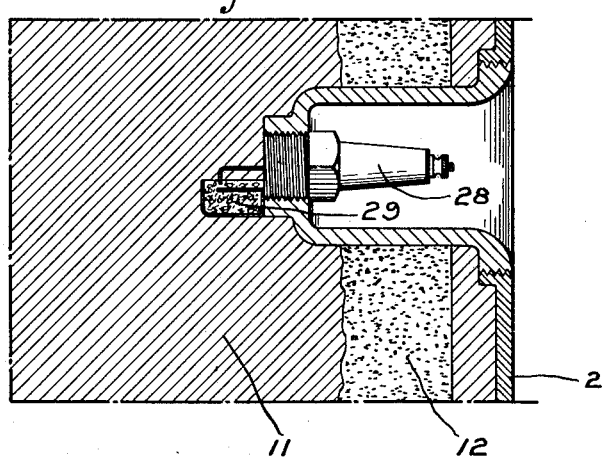
INVENTOR
Hermann C. Roth,
By Byrnes, Stebbins & Parmelee,
His Attorneys.

Patented Sept. 17, 1929

1,728,510

UNITED STATES PATENT OFFICE

HERMANN C. ROTH, OF DORMONT, PENNSYLVANIA

METHOD FOR THE MANUFACTURE OF CHROMIC OXIDE

Application filed May 12, 1927. Serial No. 190,717.

My invention relates to a method for the manufacture of chromic oxide from an alkali bichromate.

One object of my invention is to provide a method of making chromic oxide in an airtight retort.

Another object of my invention is to provide a method of making chromic oxide by an exothermic reaction in the presence of a reducing substance without the application of external heat.

Another object of my invention is to provide a method for improving the quantity of chromic oxide made by utilizing unleached chromic oxide as an insulating medium during the making of chromic oxide from an alkali bichromate.

Another object of my invention is to provide a method for making chromic oxide that utilizes the heat of reaction of a portion of a charge for heating the major portion of the charge to reaction temperature.

Another object of my invention is to provide a method for making chromic oxide that utilizes the heat of reaction of a charge of alkali bichromate for volatilizing a reducing agent, such as sulphur.

At the present time chromic oxide ($Cr_2O_3$) is manufactured from an alkali bichromate such as sodium or potassium bichromate in the presence of a reducing agent such as sulphur or carbon, or a mixture of both, in a horizontal muffle furnace heated to a temperature of about 600 to 700 degrees C. Theoretically, the amount of the reducing agent applied to the mixture is such that none of it should be free after the reaction has taken place. However, as a practical expedient, it has been found advisable to add a considerable amount of a reducing agent in excess of the theoretical quantity in order to secure a more complete conversion of the bichromate into chromic oxide.

When sulphur is used as a reducing agent, an appreciable amount of the sulphur gases generated in the muffle escape to the surrounding atmosphere through the many openings and crevices of an ordinary muffle thereby burning to noxious sulphur dioxide fumes. Also an appreciable amount of air is drawn through the furnace during the reaction which escapes into the adjacent atmosphere with the loss of a considerable amount of sulphur and resulting in an incomplete chemical reaction. Thermo-chemical calculations show that the reaction of sodium or potassium bichromate with sulphur is an exothermic reaction and that, when once initiated, the heat resulting is sufficient to raise the temperature of the substances to the temperature required for reaction and also to volatilize any reasonable excess of sulphur present.

Accordingly, I provide a closed retort in which is inserted a charge of alkali bichromate and sulphur which is initially ignited. Thereafter the reaction takes place with the liberation of a considerable quantity of heat and the expansion of the charge to substantially twice its initial volume. Since the retort is closed, no sulphur vapors escape therefrom and no outside air is drawn into the retort to hinder a complete chemical reaction. The sulphur vapors are conducted to a condensing apparatus where they are precipitated either in a solid or liquid condition as may be desired. The condensing apparatus may also be connected to a source of inert gas such that the latter fills the condensing apparatus as the pressure therein drops during the condensation process.

The accompanying drawing is a diagrammatic illustration of an embodiment of my invention and is not to be considered a limitation thereof, as it is obvious that the invention may be practiced in other apparatus.

In the accompanying drawings:

Figure 1 is a view, partially in elevation and partially in section, of a diagrammatic embodiment of my invention;

Figure 2 is a sectional view of a detail of my invention; and

Figure 3 is a similar view of a further modification of my invention.

Referring to Figure 1, my apparatus may comprise in general a retort 2 mounted on a hydraulic jack 3 for cooperation with a cupola 4 connected by a pipe line 5 to a condensing apparatus 6 that in turn is connected by a pipe line 7 through a reducing valve 8 to a source 9 of inert gas.

The retort 2 may be of any suitable size and shape, and preferably lined with refractory material, depending upon the volume of the charge 11 of bichromate and reducing agent.

An insulating lining or layer 12 of chromic oxide is filled in around the walls of the retort 2 to serve as a heat insulating medium for the walls of the retort and to prevent the sticking of the charge to the retort walls during its reaction. If the unwashed substance resulting from a previous operation is used for making up the layer 12, any alkali bichromate that may have remained therein will have an opportunity to be converted into chromic oxide as this unleached substance, while mainly intended as a heat insulator, actually undergoes a second reaction.

A heater 13 may be inserted in the wall of the retort and subjected to a flame 14 for raising the temperature of the charge adjacent thereto above the ignition point. As soon as the ignition point of the charge is reached and the exothermic reaction takes place, the heater 13 may be withdrawn and the opening through which it is inserted sealed up.

The jack 3 may be of any suitable type, and as herein shown is of the hydraulic type controlled by inlet and outlet valves 15 and 16, respectively. A plunger 17 is provided with a plate 18 on which the retort 2 is mounted. The stroke of the plunger 17 is such that the retort 2 is moved upwardly into tight engagement with the cupola 4.

The cupola 4 may be supported by a suitable structure comprising angle irons 19 and is provided with an opening 21 normally closed by a valve 22 that may be operated by a handle 23 extending through a housing 24. The pipe line 5 is connected from the housing 24 to the condensing chamber 6.

The condensing apparatus 6 is provided with a door 25 through which the condensed sulphur 26 may be removed. The reducing valve 8 is provided for supplying an inert gas such as nitrogen or carbon dioxide from the container 9 to the condensing apparatus 6 when the pressure in the latter falls below a predetermined amount during the period of condensation. While I have shown the condensing apparatus 6 of sufficient size to dissipate all the thermal energy that may be liberated during the condensation process, it is obvious that suitable artificial cooling means such as a cooling coil, air blasts, water sprays or the like may be applied thereto. It is to be understood that any other type of sulphur condensing device may be used instead of the chamber shown.

A typical equation for reducing an alkali bichromate such as crystallized sodium bichromate, is as follows:

$$Na_2Cr_2O_7 . 2H_2O + S = Na_2SO_4 + Cr_2O_3 + 2H_2O$$

With potassium bichromate the equation is $$K_2Cr_2O_7 + S = K_2SO_4 + Cr_2O_3.$$

According to the foregoing equations, no free sulphur should be present at the conclusion of the reaction. However, a better chemical reaction is had when an excess of sulphur is added to the charge 11. Such sulphur and water as may be present are volatilized during the exothermic reaction and pass through the opening 21 and the pipe line 5 to the condensing apparatus 6, leaving a solid sodium sulphate ($Na_2SO_4$) and chrome oxide ($Cr_2O_3$) in the retort. After the reaction is completed the valve 22 is closed, the retort 2 lowered by the jack 3 and emptied. The retort 2 may then be filled for a subsequent operation. The sodium sulphate may be separated from the chromic oxide by a number of methods one of which is that of dissolving or leaching out the sodium sulphate.

The speed of the reaction may be retarded in a number of ways such as the addition of water in a free state or as adherent moisture, or as water of crystallization. The amount of excess sulphur volatilized absorbs heat and accordingly the rate of reaction may be controlled by the quantity of surplus sulphur added and by the size of its grains. In order to accelerate the reaction, fine grained material may be intimately mixed with the charge.

Referring to Figure 2, I have shown a retort 2 in which provision is made for igniting the charge by the insertion of a hot metallic rod 27.

In Figure 3 I have shown a form of my invention in which an electrical arc is produced by a spark plug 28 in the presence of thermite 29 or other highly combustible chemical substances in order to fire the charge 11. It is to be understood that the spark plug 12 represents one type of device for producing an electrical arc, and that other types of electrical arcs may be substituted therefor. In all of the modifications of the invention it is desirable that the ignition apparatus be withdrawn from the interior of the retort 2 during the exothermic reaction.

Accordingly, I have devised a method and apparatus for the manufacture of chromic oxide characterized by the insertion of an alkali bichromate, which term is used generically to include both an alkali metal bichromate and a non-metal alkali bichromate such as ammonium bichromate, and a reducing agent, preferably sulphur, into a closed retort, igniting the charge and then permitting an exothermic action to take place during which the excess of sulphur is volatilized and passed over to a condensing chamber. This method of making chromic oxide is advantageous in that air is prevented from entering the retort during the chemical reaction, thereby retarding the chemical reaction, and passing sulphur fumes into the atmosphere with the consumption of an unnecessarily large amount of fuel expended in heating a muffle.

It is to be understood that various changes may be made in the size, shape and disposition of the component parts of the apparatus as shown and in the manner of applying them to the method of manufacturing chromic oxide, such as the use of a horizontal muffle and a movable cupola, as well as the steps in the method, without departing from the scope of the appended claims.

I claim:

1. In the method of making chromic oxide from an alkali bichromate, the steps consisting in igniting in the absence of any oxidizing agent other than the bichromate a mixture of an alkali bichromate and a reducing agent comprising sulphur, in proportions to transform the excess sulphur present into substantially pure sulphur in a vaporized state by an exothermic reaction and then condensing the sulphur vapors.

2. In the method of making chromic oxide, the step of forming an insulating layer of chromic oxide around a charge of bichromate and a reducing agent previous to igniting the same, for preserving the heat generated in the reaction of the constituents of the charge.

In testimony whereof I have hereunto set my hand.

HERMANN C. ROTH.